US008635459B2

(12) United States Patent
Lyons et al.

(10) Patent No.: US 8,635,459 B2
(45) Date of Patent: Jan. 21, 2014

(54) RECORDING TRANSACTIONAL INFORMATION RELATING TO AN OBJECT

(75) Inventors: Nicholas P. Lyons, Sunnyvale, CA (US); Nina T. Bhatti, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2199 days.

(21) Appl. No.: 11/047,302

(22) Filed: Jan. 31, 2005

(65) Prior Publication Data

US 2006/0174136 A1 Aug. 3, 2006

(51) Int. Cl.
*G06F 12/14* (2006.01)

(52) U.S. Cl.
USPC ................. 713/189; 235/462.45; 235/462.46; 235/472.02

(58) Field of Classification Search
USPC ............ 713/189; 235/462.45, 462.46, 472.02
See application file for complete search history.

(56) References Cited

U.S. PATENT DOCUMENTS

| | | | | |
|---|---|---|---|---|
| 5,151,684 | A | 9/1992 | Johnsen | |
| 5,874,896 | A | 2/1999 | Lowe et al. | |
| 5,933,829 | A | 8/1999 | Durst et al. | |
| 5,978,773 | A | 11/1999 | Hudetz et al. | |
| 6,108,656 | A | 8/2000 | Durst et al. | |
| 6,129,274 | A | 10/2000 | Suzuki | |
| 6,169,483 | B1 | 1/2001 | Ghaffari et al. | |
| 6,169,975 | B1 | 1/2001 | White et al. | |
| 6,179,206 | B1 | 1/2001 | Matsumori | |
| 6,199,048 | B1 | 3/2001 | Hudetz et al. | |
| 6,199,753 | B1 | 3/2001 | Tracy et al. | |
| 6,294,999 | B1 | 9/2001 | Yarin et al. | |
| 6,542,933 | B1 | 4/2003 | Durst, Jr. et al. | |
| 6,572,016 | B2 | 6/2003 | Saveliev et al. | |
| 6,614,351 | B2 | 9/2003 | Mann et al. | |
| 6,616,047 | B2 | 9/2003 | Catan | |
| 6,950,939 | B2 * | 9/2005 | Tobin | 713/182 |
| 6,985,870 | B2 | 1/2006 | Martucci et al. | |
| 7,080,041 | B2 * | 7/2006 | Nagel | 705/51 |
| 7,127,261 | B2 | 10/2006 | Van Erlach | |
| 7,152,047 | B1 * | 12/2006 | Nagel | 705/76 |
| 2002/0117544 | A1 | 8/2002 | Wolf et al. | |
| 2003/0195818 | A1 | 10/2003 | Howell et al. | |
| 2003/0227392 | A1 | 12/2003 | Ebert et al. | |
| 2004/0010425 | A1 | 1/2004 | Wilkes et al. | |
| 2004/0079804 | A1 | 4/2004 | Harding et al. | |
| 2004/0128555 | A1 * | 7/2004 | Saitoh et al. | 713/201 |
| 2005/0108659 | A1 | 5/2005 | Philyaw | |
| 2005/0114270 | A1 | 5/2005 | Hind et al. | |
| 2006/0187048 | A1 | 8/2006 | Curkendall et al. | |

OTHER PUBLICATIONS

Chappell, G. et al., "Auto-ID in the Box: The Value of Auto-ID Technology in Retail Stores", Accenture, Feb. 2003, Cambridge MA.
Butschli, J—"VA Hospital Rests 'Talking' Label"—Packworld.com-http://packworld.com.ods_print.html?rec_id=12555 downloaded Jan. 31, 2002—pp. 1-4.

(Continued)

*Primary Examiner* — Amare F Tabor

(57) ABSTRACT

A unique identifier on a tag of an object is read. Transactional information relating to the object is recorded and used to encrypt the unique identifier into a code. The code is then written into memory of the tag such that the code records the transactional information.

29 Claims, 11 Drawing Sheets

(56) References Cited

OTHER PUBLICATIONS

Want, R—"The Magic of RFID"—vol. 2 No. 7 Oct. 2004—Intel Research—http://www.acmqueue.com/modules.php?name=content &=showp—pp. 1-9.

Reynolds, P et al—"Packing Delivers for Pharmaceutical and Medical Firms"—Packword.com-http://www.packworld.com/cds_print.html?rec_id=18114 downloaded Jan. 31, 2005—pp. 1-3.

Chappell G. et al., "Audio-ID in the Box: The Value of Auto-ID Technology in Retail Stores"—Accenture—Feb. 2003.

* cited by examiner

400

404A-N

| | BLOCK # | DESCRIPTION | DATA | |
|---|---|---|---|---|
| 402A | BLOCK 0 | SERIAL NO. LOW BYTES | 49EAB133 | 406A |
| 402B | BLOCK 1 | SERIAL NO. HIGH BYTES | 0000061F | 406B |
| 402C | BLOCK 2 | WRITE PROTECT | FFFFFFFF | 406C |
| 402D | BLOCK 3 | SPEC. FUNCTION | 03000000 | 406D |
| 402E | BLOCK 4 | FAMILY CODE | FF8F9F5F | 406E |
| 402F | BLOCK 5 | USER DATA | FFFFFFFF | 406F |
| 402G | BLOCK 6 | USER DATA | FFFFFFFF | 406G |
| 402H | BLOCK 7 | USER DATA | FFFFFFFF | 406H |
| • • • | • • • | | | • • • |
| 402N | BLOCK N | USER DATA | FFFFFFFF | 406N |

*FIG. 4A*

400

404A-N

| | BLOCK # | DESCRIPTION | DATA | |
|---|---|---|---|---|
| 402A | BLOCK 0 | SERIAL NO. LOW BYTES | 49EAB133 | 406A |
| 402B | BLOCK 1 | SERIAL NO. HIGH BYTES | 0000061F | 406B |
| 402C | BLOCK 2 | WRITE PROTECT | FF6FFFFF | 406C |
| 402D | BLOCK 3 | SPEC. FUNCTION | 03000000 | 406D |
| 402E | BLOCK 4 | FAMILY CODE | FF8F9F5F | 406E |
| 402F | BLOCK 5 | USER DATA | 2340AFD2 | 406F |
| 402G | BLOCK 6 | USER DATA | FEC34830 | 406G |
| 402H | BLOCK 7 | USER DATA | FFFFFFFF | 406H |
| ⋮ | ⋮ | | | ⋮ |
| 402N | BLOCK N | USER DATA | FFFFFFFF | 406N |

*FIG. 4B*

RECORDING TRANSACTIONAL INFORMATION RELATING TO AN OBJECT

BACKGROUND

Universal Product Codes (hereinafter UPC) are printed or otherwise placed on products or product packaging. Usually, the UPC is a barcode that identifies a class of product. For example, a particular UPC may represent all 64 oz bottles of detergent from a particular manufacturer. In turn, manufacturers and retailers use the UPC as a proof of purchase mechanism for product rebates and warranties. Retailers have found that people with intent to defraud will remove, without purchasing, the UPC from products in stores solely to get the mail in rebate. This causes spoilage of the product as customers are less likely to purchase an item with a damaged exterior. In addition, legitimate customers are not able to claim rebates or obtain warranties without the UPC.

SUMMARY

According to an embodiment, a method includes reading a unique identifier on a tag of an object. Transactional information relating to the object is recorded and used to encrypt the unique identifier into a code. The code is then written into memory of the tag such that the code records the transactional information.

BRIEF DESCRIPTION OF THE DRAWINGS

Embodiments of the invention are illustrated by way of example and without limitation in the accompanying figures in which like numeral references refer to like elements, and wherein:

FIGS. 4A and 4B show tables illustrating a memory layout, before and after codes have been written, of a tag in accordance with an embodiment of the invention;

DETAILED DESCRIPTION

Figure 1:
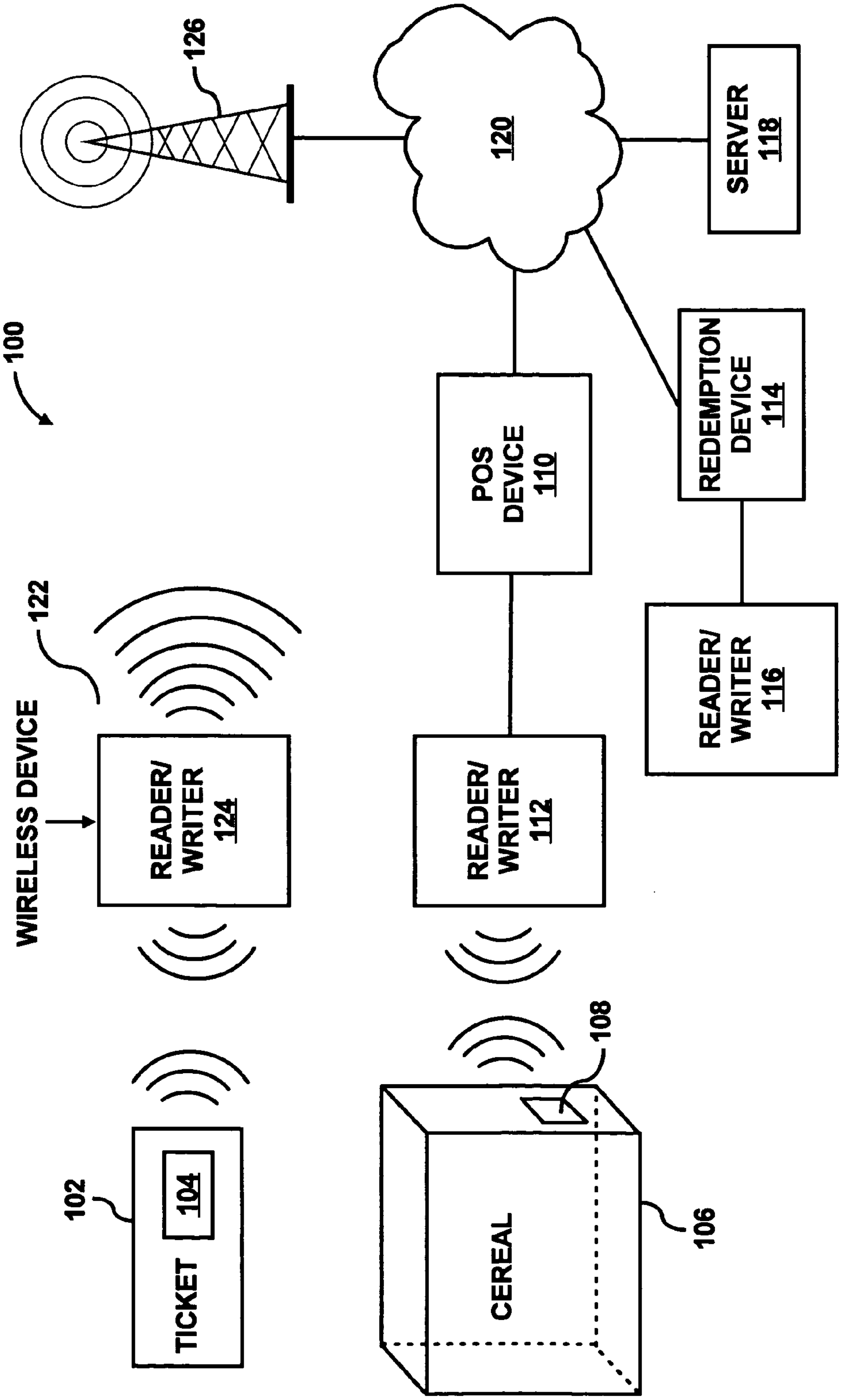
FIG. 1 shows a block diagram of a system for recording transactional information in accordance with an embodiment of the invention.

For simplicity and illustrative purposes, the principles are shown by way of examples of systems and methods described. In the following description, numerous specific details are set forth in order to provide a thorough understanding of the examples. It will be apparent however, to one of ordinary skill in the art, that the examples may be practiced without limitation to these specific details. In other instances, well known methods and structures are not described in detail so as not to unnecessarily obscure understanding of the examples.

Throughout the present disclosure, reference is made to a tag having a unique identifier. The tag may be any device having a unique identifier. In one example, the tag is a radio frequency identification device having a unique serial number written into memory. The tag is not limited to devices having radio frequency interfaces. For instance, the tag may include an electrical contact type interface or an infrared interface. The tag, in another example, may be an electronic product code having memory storing a unique serial number identifying an instance of an object to which the tag is attached. Additionally, the memory may store a family code identifying a class or genre of an object to which the tag is attached. The memory of the tag includes space for storing codes generated during transactions. The tag may be attached to an object such as a box of cereal, television set, or practically any product that may be sold. The tag may also be attached to a ticket used by a customer for tracking customer activities.

Reference is also made to transactional information. The transactional information includes any information recorded from the sale, lease, or rent of a product or service. For example, the transactional information may include the name of a customer, the date of the transaction, the name or address of the store, or any other information that may be relevant to the transaction.

In an example, a system implements a method for recording transactional information of an object. The object includes a tag having a unique identifier and memory. For instance, a box of cereal may have a radio frequency identification tag (hereinafter referred to as an "RFID tag") including a unique serial number. The serial number is unique and is therefore different for each box of cereal even though, in other respects, each box of cereal appears identical to every other box of the same cereal. Accordingly, the tag, which includes the unique identifier, uniquely identifies the object.

At a point of sale device, the unique identifier is read and the transactional information is recorded. The unique identifier and at least a portion of the transactional information are encrypted into a code. The code is then written into a portion of the memory of the tag. The code may then be used in a variety of manners, including but not limited to, verification of the transactional information. For instance, the code may be used to verify that the object was purchased, purchased with additional warranty protection, purchased "as is," returned or used for a rebate redemption. Therefore, the code may be used to verify transactional information regarding value added to the object by a customer's transaction. Additionally, the code may be used to verify transactional information regarding value deducted from the object by a customer's transaction. For instance, the object may be a ticket used in an amusement park. The customer may purchase the ticket that is good for a number of rides or refreshments. Each time the ticket is used to buy a soda or experience a ride, a code is added and the value of the ticket to the customer declines.

With reference first to FIG. 1, there is shown a block diagram of a system 100 for recording transactional information of an object. The object may be a ticket 102 including a tag 104 or a product 106, such as a box of cereal, including a tag 108. The system 100 includes a point of sale device 110 having a reader/writer 112, a redemption device 114 having a reader/writer 116 and a server 118 all interconnected by a network 120. Additionally, the system 100 may include a wireless device 122 having a reader/writer 124 interconnected through the network 120 to the server 118 by a wireless access point 126.

The point of sale device 110 uses the reader/writer 112 for reading a unique identifier of the tag 104, which is attached to the product 106, and captures transactional information related to the sale of the product 106. The transactional information, or a portion thereof, may be used by the point of sale device 110 in an encryption algorithm along with the unique identifier to produce a code which is then stored in writable memory of the tag 106. In another example, the transactional information, or a portion thereof, and the unique identifier may be transmitted to the server 118 for recordation and encryption. In this example, the point of sale device 110 discovers that the server 118 is unavailable due to a network 120 outage or server 118 downtime. Accordingly, the point of sale device 110 may store the transactional information and unique identifier for later transfer to the server 118 and use the transactional information, or a portion thereof, in an encryption algorithm along with the unique identifier to produce a code which is then stored in writable memory of the tag 106 as in the example described above.

The redemption device 114 uses the reader/writer 116 for reading the unique identifier of the tag 104 and the code stored in the memory of the tag 104. The code and the unique identifier may be used by the redemption device 114 to validate the sale of the product 106. In one example, the redemption device 114 decrypts the code and compares the decrypted code with at least a portion of the transactional information collected from a customer. In another example, the redemption device 114 transmits the code to the server 118 which uses the code to access a data record to validate the sale of the product 106 or, alternatively, decrypts the code and compares the decrypted code with at least a portion of the transactional information collected from a customer. In this example, the redemption device 114 may discovers that the server 118 is unavailable due to a network 120 outage or server 118 downtime. Accordingly, the redemption device 114 may decrypt the code and compare the decrypted code with at least a portion of the transactional information collected from a customer to validate the sale of the product 106.

The point of sale device 110 and redemption device 114 may be implemented in a store, for example, as a cash register, a redemption terminal, kiosk, or any sales terminal. In some instances, the point of sale device 110 and the redemption device 114 may be co-located in the same physical device and implemented as software residing therein. The reader/writer 112 may be the same device as reader/writer 116 if the point of sale device 110 is configured to operate as the redemption device 114. Additionally, these devices may be configured to operate in a stand-alone mode without using the network 120 or the server 118. However, when used in conjunction with the server 118, the server 118 may perform a variety of tasks for the devices 110 and 114 and operate in a variety of manners described below.

The server 118, in some instances, may perform the encryption and decryption tasks in order to provide higher level security or encryption/decryption processes. In addition, updating software or encryption/decryption algorithms may be easier and more secure if they are centrally located on the server 118 rather than located on a plurality of devices 110 and 114 spread throughout several locations. Alternatively, the server 118 may perform additional tasks such as using the code as a key into a database for retrieving and using transactional information to validate the purchase of the product 106.

The network 120 may be wired and/or wireless. In a wireless environment, the system 100 may also include a wireless device 122 having a reader/writer 124 interconnected through the network 120 to the server 118 by a wireless access point 126. In this example, the wireless device 122 may operate as a point of sale device 110 and/or a redemption device 114 as described above.

Additionally, one or more servers, such as the server 118, may be connected to one or more auxiliary information services, such as one or more public information sources, one or more private information sources, or any combination of public and/or private information sources or servers linked by one or more networks.

Figure 2A:
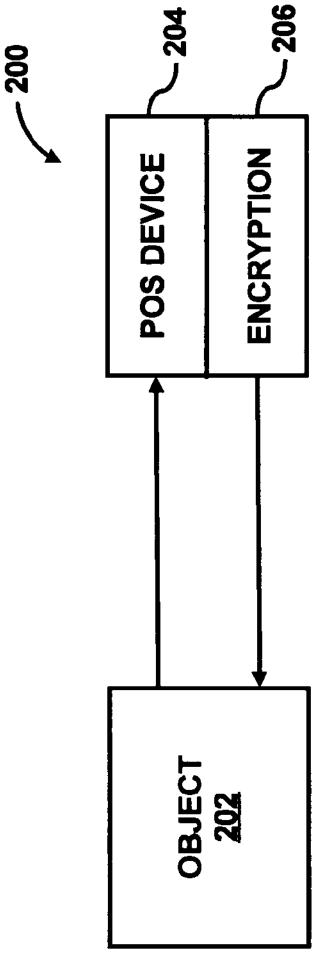
FIGS. 2A and 2B, collectively, show a block diagram of a system for recording transactional information in accordance with an embodiment of the invention.
Figure 2B:
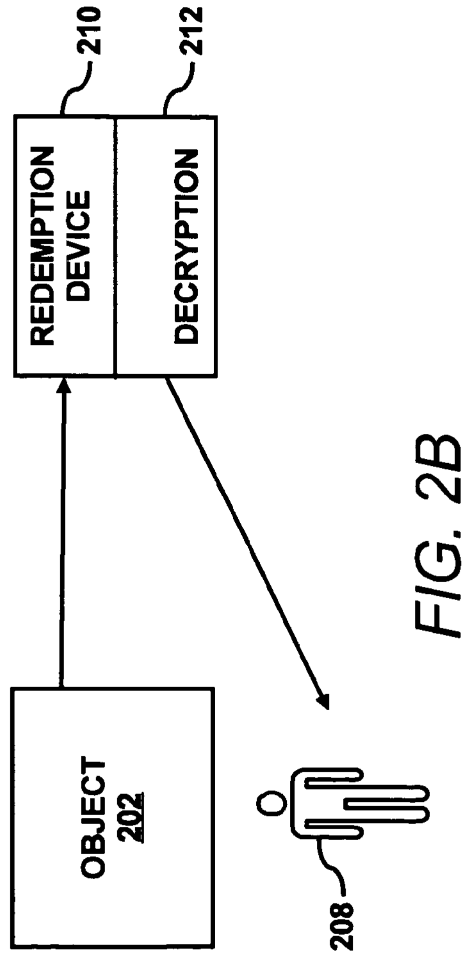

With reference now to FIGS. 2A and 2B, there is shown block diagrams of a system 200 for recording transactional information in accordance with an example. In FIG. 2A, an object 202 is purchased at a point of sale device 204. The point of sale device 204 reads a unique identifier from a tag located on the object 202 and collects transactional information related to the purchase. The point of sale device 204 includes an encryption device 206 which encrypts the unique identifier and at least one portion of the transactional information into a code. The point of sale device 204 then writes the code into memory of the tag. In some instances, the memory may be configured into blocks which may be configured such that a block may be changed from a write/read state to a read-only state.

A customer 208, shown in FIG. 2B, may accrue benefits, such as the right to redeem a rebate, by purchasing the object 202. The user 208 may present the object 202, or only the tag, at a redemption device 210 for redeeming the rebate. The redemption device 210 reads the code stored in memory of the tag, reads the unique identifier from the tag, and collects some transactional information from the customer 208. The redemption device 210 may include a decryption device 212 for decrypting the code to verify that the transactional information is valid. If the purchase is validated, the redemption device 210 may provide something of value to the customer 208. For example, the redemption device 210 may dispense a check, money, or coupon directly to the customer 208. Alternatively, the redemption device 210 may credit the customer's account or grant access to a good or service.

In another example, the object 202 may be a decreasing, increasing or constant value ticket. An increasing value ticket may be used to keep track of the number of purchases made by the customer and provide something of value to the customer once a predetermined number of purchases have been made. For instance, once the customer 208 has purchased ten pizzas from an establishment, the customer 208 may use the ticket to get the next pizza free. A decreasing value ticket may be used to keep track of the number of benefits that have accrued to a customer. For instance, the customer 208 may purchase a ticket for ten rides at an amusement park. When redeemed at each ride, the ticket value decreases by one until it reaches zero. A constant value ticket grants access to a good or service for as long as the tag is deemed valid, that is, for an extra payment an amusement park may grant, for example, access to special short lines at any ride in the park for the date the tag is valid) and does not increase nor decrease in value.

Figure 3A:
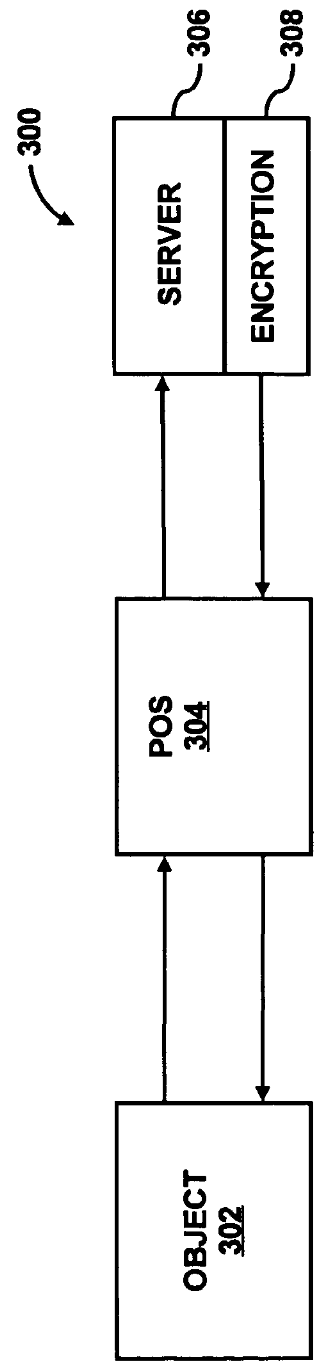
FIGS. 3A, 3B, 3C, and 3D, collectively, show a block diagram of a system for recording transactional information in accordance with another embodiment of the invention.

With reference now to FIGS. 3A, 3B, 3C, and 3D, there is shown block diagrams of a system 300 for recording transactional information in accordance with an example. In FIG. 3A, an object 302 is purchased at a point of sale device 304. The point of sale device 304 reads a unique identifier from a tag located on the object 302 and collects transactional information related to the purchase. The point of sale device 304 transmits this information to a server 306 which includes an encryption device 306 which encrypts the unique identifier and at least one portion of the transactional information into a code. The server 306 stores the code and the transactional information in a database or other storage structure and transmits the code to the point of sale device 304. The point of sale device 304 then writes the code into memory of the tag. In some instances, the memory may be configured into blocks which may be configured such that a block may be changed from a write/read state to a read-only state.

Figure 3B:
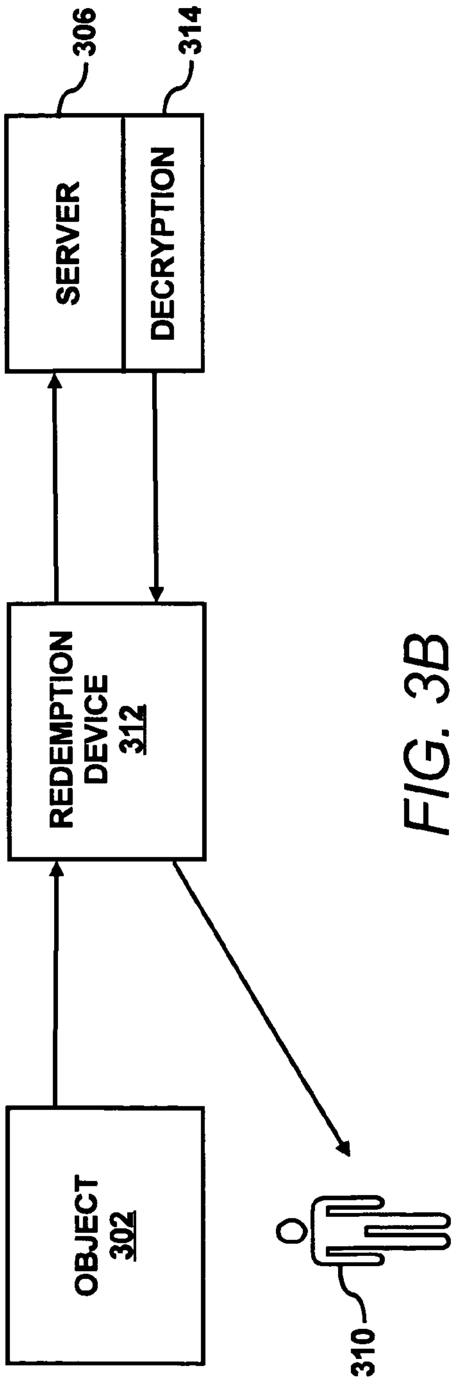

In FIG. 3B, a customer 310 redeems a rebate or other benefit by presenting the object 302, or only the tag, at a redemption device 312. The redemption device 312 reads the code stored in the tag's memory, reads the unique identifier from the tag, and collects some transactional information from the customer 310. The redemption device 312 transmits this information to the server 306 that may include a decryption device 314 for decrypting the code to verify that the transactional information is valid. Alternatively, the server 306 may compare the code to a database entry storing the transactional information in order to verify the purchase. The server 306 then transmits an answer back to the redemption device 312. If the purchase is validated, the redemption device 312 may provide something of value to the customer 310. For example, the redemption device 312 may dispense a check, money, or coupon directly to the customer 310. Alternatively, the redemption device 312 may credit the customer's account.

Figure 3C:
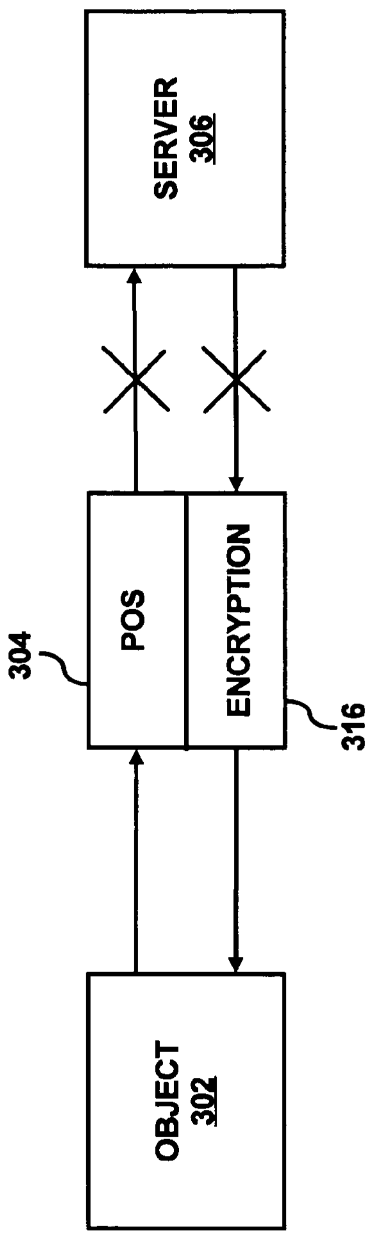
Figure 3D:
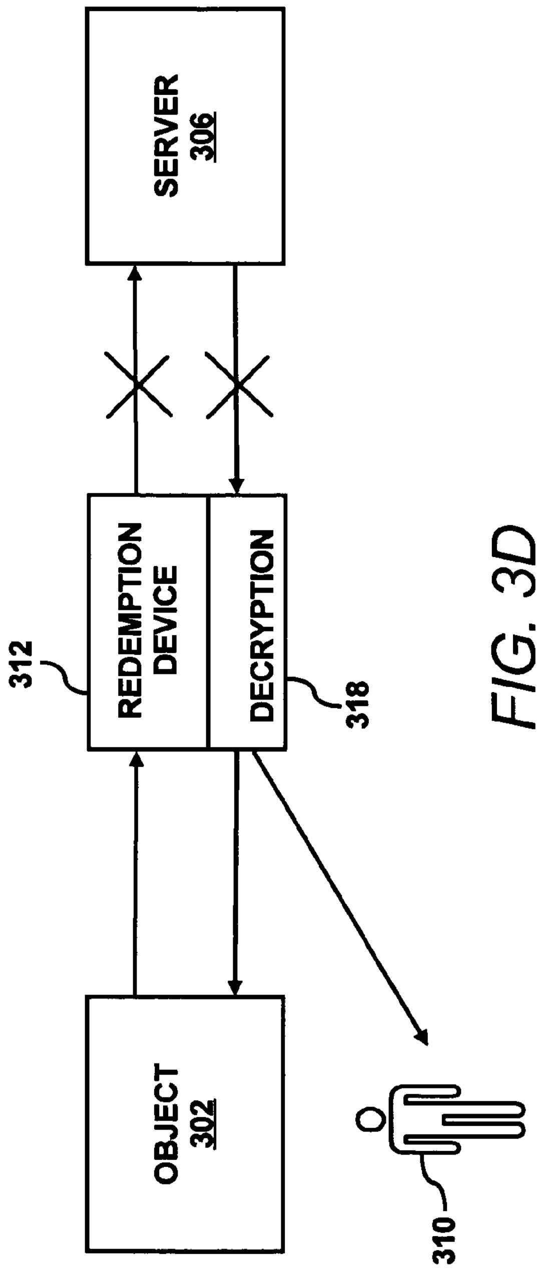

FIGS. 3C and 3D illustrate instances when the server 306 may be unavailable. In FIG. 3C, an object 302 is purchased at a point of sale device 304. The point of sale device 304 reads a unique identifier from a tag located on the object 302 and collects transactional information related to the purchase. The point of sale device 304, upon detecting that the server 306 is unavailable, uses an encryption device 316 to encrypt the unique identifier and at least one portion of the transactional information into a code. The point of sale device 304 then writes the code into memory of the tag and stores the unique identifier and the transactional information for later transmitting to the server 306.

In FIG. 3D, a customer 310 redeems a rebate or other benefit by presenting the object 302, or only the tag, at a redemption device 312. The redemption device 312 reads the code stored in the tag's memory, reads the unique identifier from the tag, and collects some transactional information from the customer 310. The redemption device 312, upon detecting that the server 306 is unavailable, uses a decryption device 318 to decrypt the code to verify that the transactional information is valid. If the purchase is validated, the redemption device 312 may provide something of value to the customer 310 and store a record of the redemption for later transmitting to the server 306.

In FIGS. 4A and 4B, there are shown tables illustrating a memory layout 400 of a tag in accordance with an example. The memory layout 400 includes three columns showing memory blocks 0-*n* (where n may be any number) labeled 402*a*-402*n*, a description 404*a*-404*n* for each memory block 402*a*-402*n*, and an example of data 406*a*-406*n* which may be stored in the memory blocks 402*a*-402*n*. The data 406*a*-406*n* is written in hexadecimal form for purposes of simplifying understanding of the illustration. In this example, the memory blocks 402*a* and 402*b* include the low order bytes and high order bytes, respectively, that together comprise a unique serial number which may be used as the unique identifier as described herein. The memory block 402*c* may be used for setting one of the memory blocks 402*f*-402*n* to a read-only state. The memory blocks 402*f*-402*n* store data 406*f*-406*n* for a user of the tag. The memory blocks 402*f*-402*n* may store the codes as described above. Before the tag has been used, the data 406*c* in the memory block 402*c*, which stores write protect information 404*c*, may be set to a predetermined state (for example, all 1's). Likewise, the data 406*f*-406*n* in the memory blocks 402*f*-402*n* may be set to a predetermined state (for example, all 1's).

FIG. 4B shows the table of the memory layout 400 illustrated in FIG. 4A after a code has been written. The data 406*c* in the memory block 402*c*, which stores write protect information 404*c*, has changed to a new value to represent that the memory blocks 402*f* and/or 402*g* are write protected, that is, the memory blocks 402*f* and/or 402*g* are now in a read-only state. Likewise, the memory blocks 402*f* and 402*g* now contain the codes 406*f* and 406*g* respectively. One of ordinary skill in the art will recognize that memory may be configured in a variety of manners and the codes may be stored in memory in a variety of manners. Therefore, the preceding discussion of memory blocks and number of bytes per code shown in the FIGS. 4A and 4B are for purposes of illustration and are not meant to be limiting.

Figure 5:
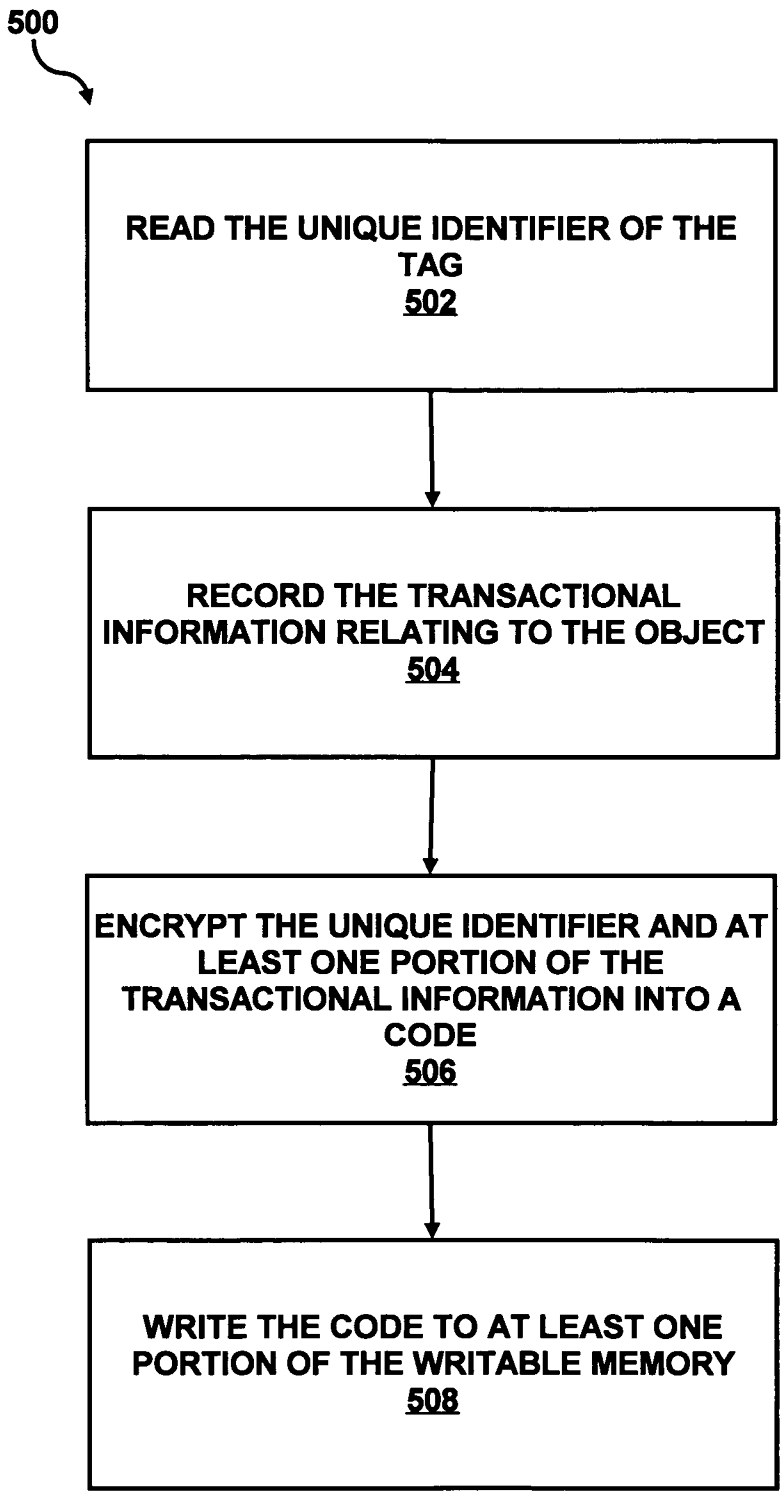
FIG. 5 shows a flow diagram of an operational mode of a system for recording transactional information in accordance with an embodiment of the invention.

FIG. 5 shows a flow diagram of an operational mode 500 of a system for recording transactional information. The following description of the operational mode 500 is made with reference to the system 100 illustrated in FIG. 1, and thus makes reference to the elements cited therein. The following description of the operational mode 500 is one manner in which the system 100 may be implemented. In this respect, it is to be understood that the following description of the operational mode 500 is but one manner of a variety of different manners in which such a system may be operated.

In the operational mode 500, the point of sale device 110 reads the unique identifier of the tag 108, using the reader/writer, at step 502. The point of sale device 110 also records the transactional information relating to the object 106 is recorded at step 504. The point of sale device 110 then encrypts the unique identifier and at least one portion of the transactional information into a code at step 506 and writes the code into memory of the tag 108 at step 508.

Figure 6:
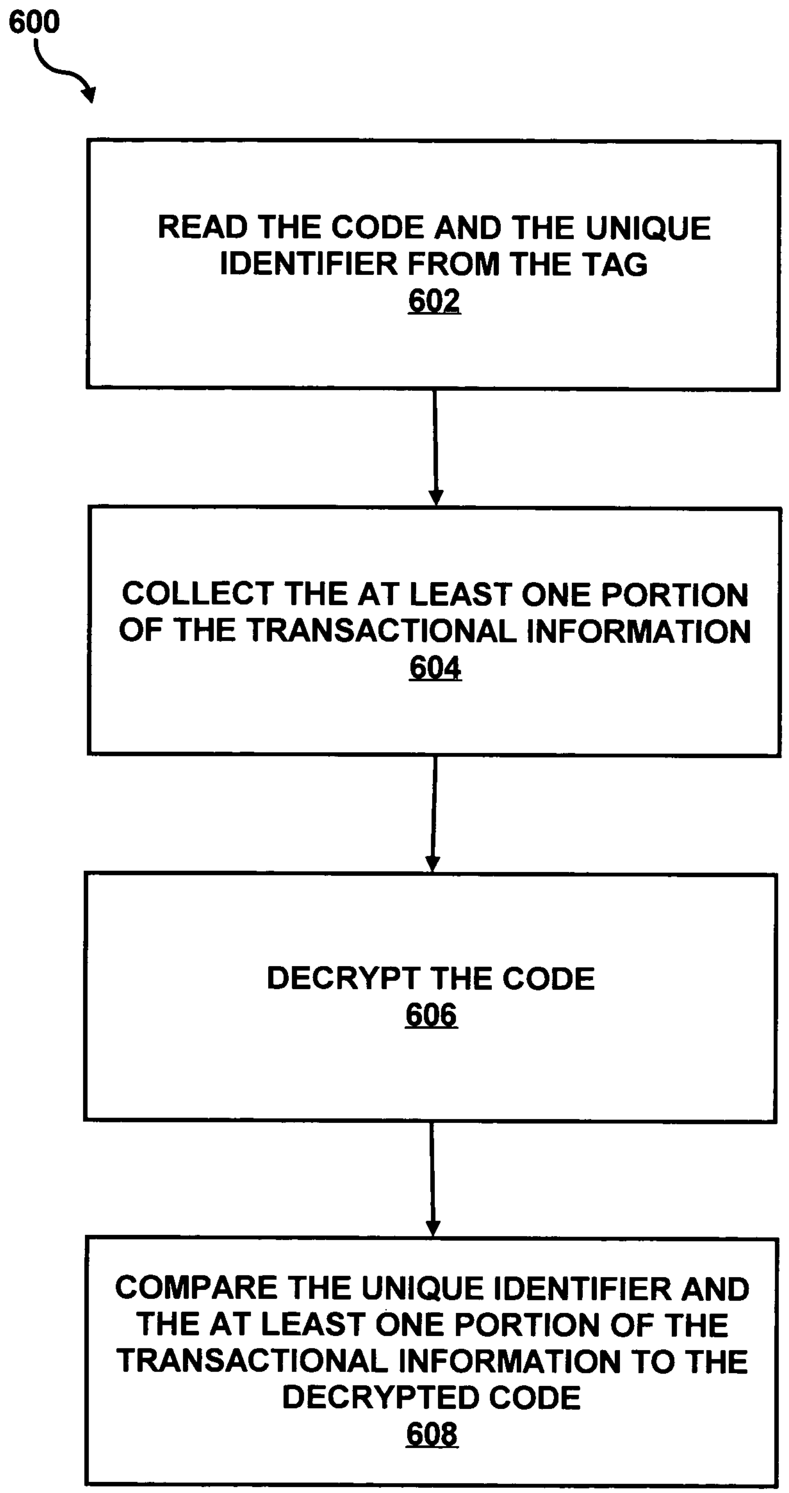
FIG. 6 shows a flow diagram of an operational mode of a system for recording transactional information in accordance with another embodiment of the invention.

FIG. 6 shows a flow diagram of an operational mode 600 of a system for recording transactional information. The following description of the operational mode 600 is made with reference to the system 100 illustrated in FIG. 1, and thus makes reference to the elements cited therein. The following description of the operational mode 600 is one manner in which the system 100 may be implemented. In this respect, it is to be understood that the following description of the operational mode 600 is but one manner of a variety of different manners in which such a system may be operated.

In the operational mode 600, the redemption device 114 reads the code and the unique identifier from the tag 108 using the reader/writer 116 at step 602. The redemption device 114 collects transactional information, from a customer for example, at step 604. The redemption device 114 then decrypts the code at step 606. The redemption device 114 compares the unique identifier and the transactional information to the decrypted code to verify the transactional information at step 608.

Figure 7:
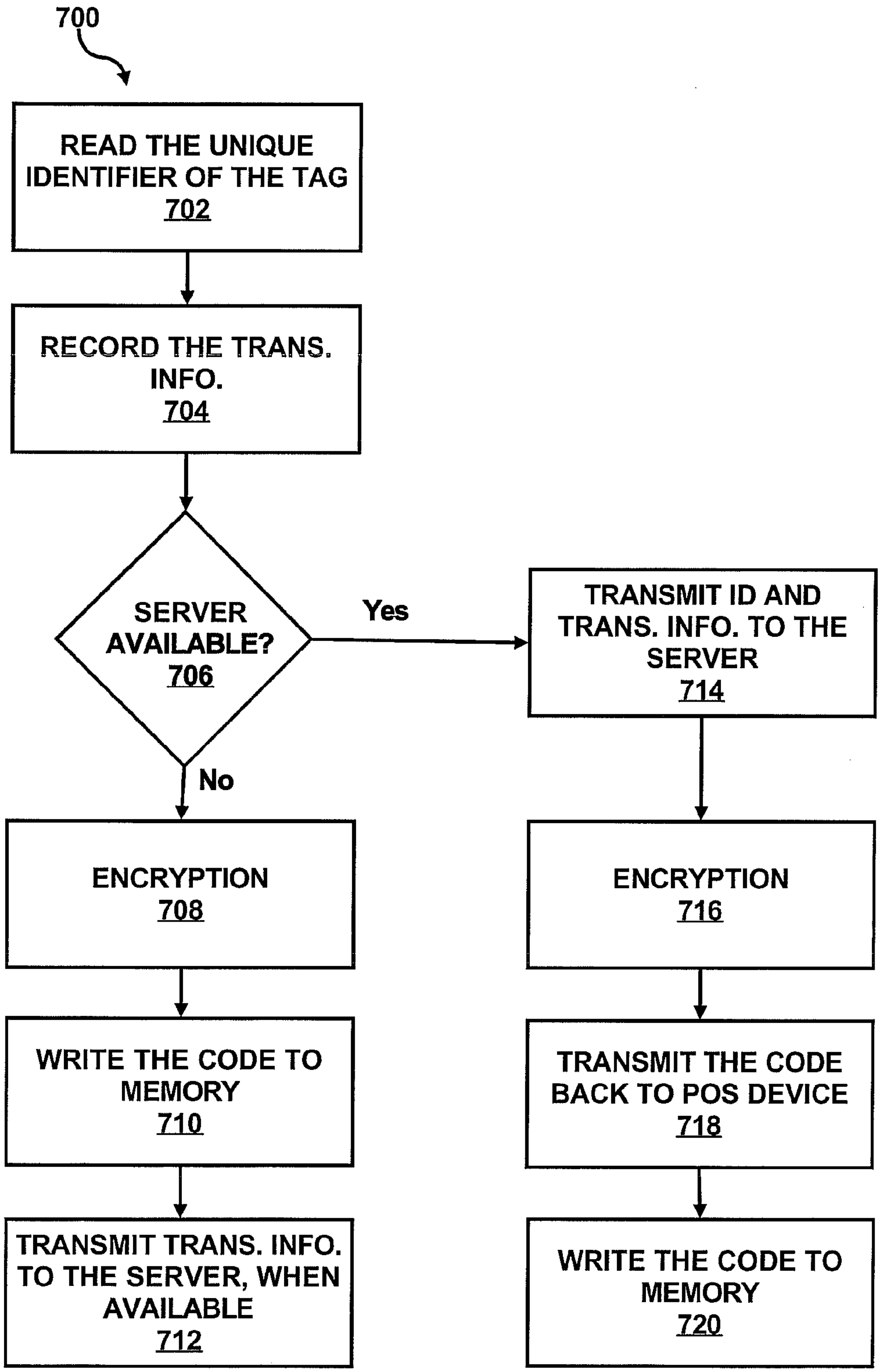
FIG. 7 shows a flow diagram of an operational mode of a system for recording transactional information in accordance with another embodiment of the invention.

FIG. 7 shows a flow diagram of an operational mode 700 of a system for recording transactional information. The following description of the operational mode 700 is made with reference to the system 100 illustrated in FIG. 1, and thus makes reference to the elements cited therein. The following description of the operational mode 700 is one manner in which the system 100 may be implemented. In this respect, it is to be understood that the following description of the operational mode 700 is but one manner of a variety of different manners in which such a system may be operated.

In the operational mode 700, the point of sale device 110 reads the unique identifier from the tag 108, using the reader/writer 112, at step 702. The point of sale device 110 also records the transactional information relating to the purchase of the object 106 at step 704. The point of sale device 110 then checks to determine if the server 118 is available at step 706. If the server 118 is unavailable, the point of sale device 110 encrypts the transactional information and the unique identifier into a code and stores the transactional information and the unique identifier in a database or other data structure at step 708. The point of sale device 110 then writes the code into the memory of the tag 108, using the reader/writer 112, at step 710. Additionally, the point of sale device 110 may also set the memory block, in which the code is written, to a read-only state at step 710. The point of sale device 110 transmits the information stored at step 708 to the server 118 when the server 118 becomes available at step 712.

If the server 118 is available at step 706, the point of sale device 110 sends the unique identifier and the transactional information to the server 118 at step 714. The server 110 then encrypts the transactional information and the unique identifier into a code at step 716. Additionally, at step 716, the server 110 may record the transactional information in a database or other data structure using the code as an index to the transaction entry in the database. That is, the code may be a key index or other reference which may later be used to access the record storing the transactional information. The server 118 then transmits the code back to the point of sale device 110 at step 718. The point of sale device 110, using the reader/writer 112, then writes the encrypted code into the memory of the tag 108 at step 720. Additionally, the point of sale device 110 may also set the memory block, in which the code is written, to a read-only state at step 720.

Figure 8:
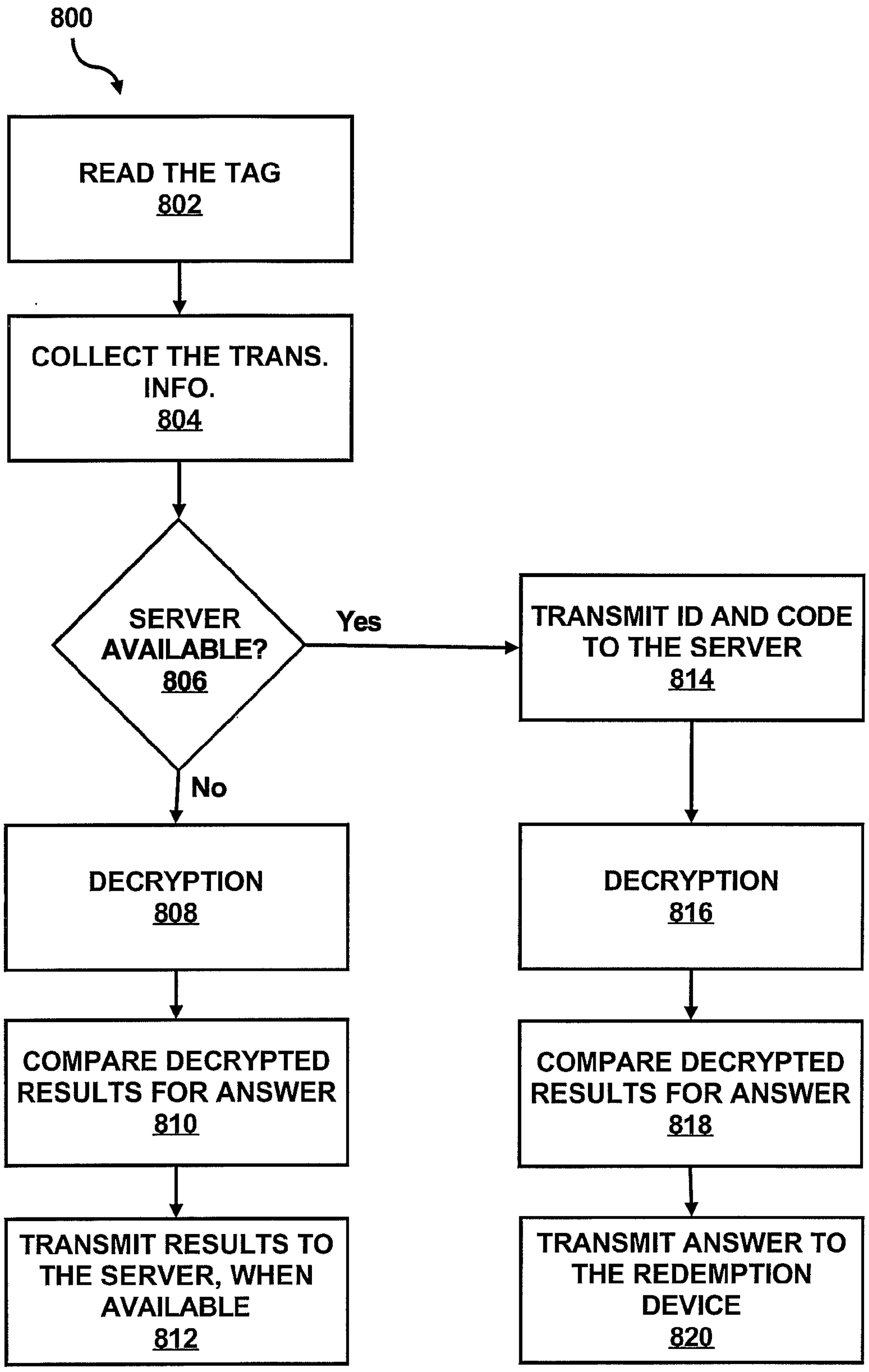
FIG. 8 shows a flow diagram of an operational mode of a system for recording transactional information in accordance with another embodiment of the invention.

FIG. 8 shows a flow diagram of an operational mode 800 of a system for recording transactional information. The following description of the operational mode 800 is made with reference to the system 100 illustrated in FIG. 1, and thus makes reference to the elements cited therein. The following description of the operational mode 800 is one manner in which the system 100 may be implemented. In this respect, it is to be understood that the following description of the operational mode 800 is but one manner of a variety of different manners in which such a system may be operated.

In the operational mode 800, the redemption device 114 reads the code and the unique identifier from the tag 108 using the reader/writer 116 at step 802. The redemption device 114 collects transactional information, from a customer for example, at step 804. In addition, the redemption device 114 may allow the user to select which transaction he wants to utilize if more than one is offered. For example, a vending machine might allow you to indicate any of several items you wish to redeem for the code on the tag. In other cases like admission to a ride there may only be a single choice and hence no user selection is required. The redemption device 114 then checks to determine if the server 118 is available at step 806. If the server 118 is unavailable, the redemption device 114 decrypts code at step 808. The redemption device 114 compares the unique identifier and the transactional information to the decrypted code to verify the transactional information at step 810 and allows or disallows a redemption based upon the result. The redemption device 114 may transmit the answer to the server 118 when the server 118 becomes available at step 812 so that the server may credit or debit an account for the customer.

If the server 118 is available at step 806, the redemption device 114 sends the code and the tag's unique identifier to the server 118 at step 814. The server 118 decrypts the code at step 816 in order to compare the tag's unique id number to a value stored within the encrypted code for authentication purposes or alternatively, use the code as a key or query to reference a record in a database or other data structure. The server 118 compares the decrypted result with the authentication information sent from the redemption device to verify the transaction code's authenticity at step 818. The server 118 then transmits an answer back to the redemption device 114 at step 820. Additionally, the server 118 may credit or debit an account for the customer.

Some of the steps illustrated in the operational modes 500, 600, 700, and 800 may be contained as a utility, program, subprogram, in any desired computer accessible medium. In addition, the operational modes 500, 600, 700, and 800 may be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer readable medium, which include storage devices and signals, in compressed or uncompressed form.

Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

Figure 9:
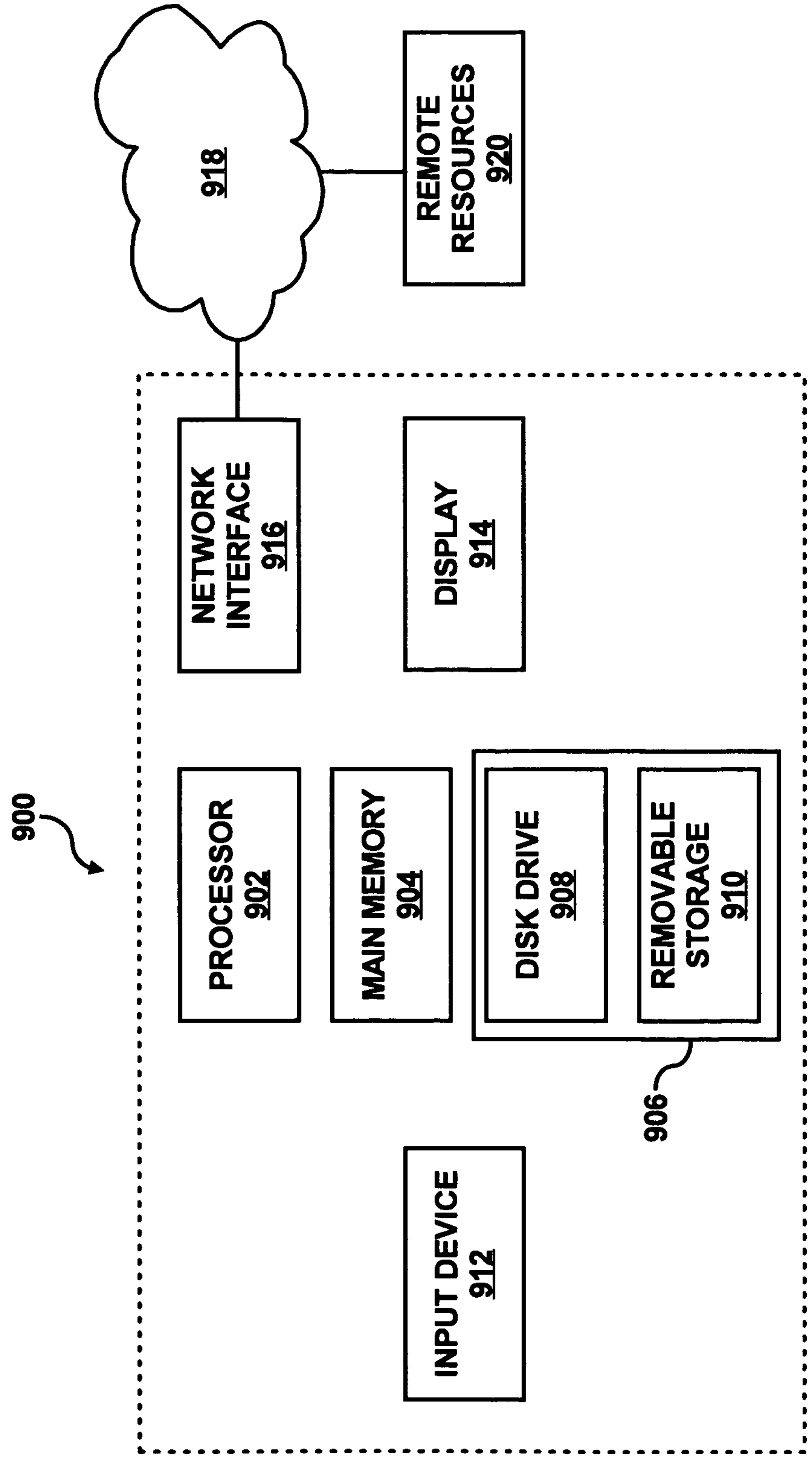
FIG. 9 shows a schematic diagram of a computer system in which embodiments of the invention may be implemented.

FIG. 9 illustrates an exemplary block diagram of a computer system 900 that may implement some of the methods shown in FIGS. 5, 6, 7, and 8. The computer system 900 includes one or more processors, such as processor 902, providing an execution platform for executing software. The processor 902 may also execute an operating system (not shown) for executing the software in addition to performing operating system tasks.

The computer system 900 also includes a main memory 904, such as a Random Access Memory (RAM), providing storage for executing software during runtime and mass storage 906. The mass storage 906 may include a hard disk drive 908 and/or a removable storage drive 910, representing a floppy diskette drive, a magnetic tape drive, a compact disk drive, or a nonvolatile memory where a copy of software or data may be stored. Applications and resources may be stored in the mass memory 906 and transferred to the main memory 904 during run time. The mass memory 906 may also include ROM (read only memory), EPROM (erasable, programmable ROM), EEPROM (electrically erasable, programmable ROM).

A user interfaces with the computer system 900 with one or more input devices 912, such as a keyboard, a mouse, a stylus, or any other input device and views results through a display 914. A network interface 916 is provided for communicating through a network 918 with remote resources 920. The remote resources 920 may include servers, remote storage devices, data warehouses, or any other remote device capable of interacting with the computer system 900.

What has been described and illustrated herein are examples of the systems and methods described herein along with some of their variations. The terms, descriptions and figures used herein are set forth by way of illustration only and are not meant as limitations. Those skilled in the art will recognize that many variations are possible within the spirit and scope of these examples, which intended to be defined by the following claims and their equivalents in which all terms are meant in their broadest reasonable sense unless otherwise indicated.

What is claimed is:

1. A method performed with a computer readable storage medium for recording transactional information relating to an object including a tag having a unique identifier and memory, the method comprising:

reading the unique identifier of the tag;

recording the transactional information relating to the object;

encrypting the unique identifier and at least one portion of the transactional information into a code;

writing the code to the memory of the tag at a point of a transaction of the object;

reading the code and the unique identifier from the tag;

decrypting the code;

collecting the at least one portion of the transactional information from a source other than the tag; and comparing the unique identifier and the at least one portion of the transactional information to the decrypted code.

2. The method of claim 1, further comprising:

transmitting the unique identifier and the transactional information to a server; and storing the unique identifier and the transactional information in a record on the server using the code as a key to the record.

3. The method of claim 2, further comprising:

if the server is unavailable, storing the unique identifier and the transactional information for transferring to the server when the server is available.

4. The method of claim 2, further comprising:

transmitting the code to the server;

decrypting the code at the server; and comparing the unique identifier and the transactional information in the record on the server to the decrypted code.

5. The method of claim 1, further comprising:

setting the at least one portion of the memory to a read-only state.

6. The method of claim 1, further comprising:

subsequent to writing the code to the memory, debiting an account value related to the object.

7. The method of claim 1, further comprising:

subsequent to writing the code to the memory, crediting an account value related to the object.

8. A method performed with a computer readable storage medium for verifying transactional information relating to an object including a tag having a unique identifier and memory for storing a code created from encrypting the transactional information and the unique identifier, the method comprising:

reading the code and the unique identifier from the tag;

collecting at least one portion of the transactional information at a redemption device, wherein, at a point of a transaction of the object after a manufacturing of the object including a tag having a unique identifier and memory, the transactional information is collected and the code is stored in the memory;

determining if a server is available;

if the server is unavailable, decrypting the code; and comparing the unique identifier and the at least one portion of the transactional information to the decrypted code.

9. The method of claim 8, further comprising: if a server is available, transmitting the code to a server;

decrypting the code at the server; and transmitting the decrypted code to the redemption device.

10. The method of claim 9, further comprising:

upon verification of the transactional information, providing a rebate to a user.

11. The method of claim 8, further comprising:

if the server is available, transmitting the code to the server;

using the code to access a record verifying the transactional information; and transmitting verification of the transactional information to the redemption device.

12. A non-transitory computer readable storage medium on which is embedded one or more computer programs, said one or more computer programs implementing a method for recording transactional information relating to an object including a tag having a unique identifier and memory, said one or more computer programs comprising a set of instructions for:

reading the unique identifier of the tag;

recording the transactional information relating to the object;

encrypting the unique identifier and at least one portion of the transactional information into a code;

writing the code to the memory of the tag at a point of a transaction of the object after a manufacturing of the object including the tag having the unique identifier and memory, wherein the transactional information is collected at the transaction point; and setting the at least one portion of the memory to a read-only state.

13. The non-transitory computer readable storage medium according to claim 12, the one or more computer programs further comprising a set of instructions for:

reading the code and the unique identifier from the tag;

collecting the at least one portion of the transactional information;

decrypting the code;

comparing the unique identifier and the at least one portion of the transactional information to the decrypted code.

14. The non-transitory computer readable storage medium according to claim 12, the one or more computer programs further comprising a set of instructions for:

transmitting the unique identifier and the transactional information to a server; and storing the unique identifier and the transactional information in a record on the server using the code as a key to the record.

15. The non-transitory computer readable storage medium according to claim 14, the one or more computer programs further comprising a set of instructions for:

if the server is unavailable, storing the unique identifier and the transactional information for transferring to the server when the server is available.

16. The non-transitory computer readable storage medium according to claim 14, the one or more computer programs further comprising a set of instructions for:

reading the code;

transmitting the code to the server;

decrypting the code; and comparing the unique identifier and the transactional information to the decrypted code.

17. The non-transitory computer readable storage medium according to claim 12, the one or more computer programs further comprising a set of instructions for:

debiting an account value related to the object.

18. The non-transitory computer readable storage medium according to claim 12, the one or more computer programs further comprising a set of instructions for:

crediting an account value related to the object.

19. A computer system for recording transactional information relating to an object including a tag having a unique identifier and writable memory comprising:

means for reading the unique identifier of the tag;

means for recording the transactional information relating to the object;

means for transmitting the unique identifier and the transactional information to a server;

means for encrypting the unique identifier and at least one portion of the transactional information into a code; and means for writing the code to at least one portion of the writable memory of the tag at a point of a transaction of the object;

means for reading the code and the unique identifier from the tag;

means for decrypting the code;

means for collecting the at least one portion of the transactional information from a source other than the tag; and means for comparing the unique identifier and the at least one portion of the transactional information to the decrypted code.

20. The computer system of claim 19, further comprising:

means for transmitting the code to the server;

means for decrypting the code at the server; and means for comparing the unique identifier and the transactional information at the server to the decrypted code.

21. A computer system comprising:

a point of sale device for capturing transactional information related to a point of transaction of at least one object including a tag having a unique identifier and memory;

a reader for reading the unique identifier from the tag the object;

an encryption device for encrypting the unique identifier with at least one portion of the transactional information into a code;

a writer for writing the code to the memory of the tag at a point of a transaction of the object; and a redemption device to capture the code and the unique identifier from the tag, decrypt the code, collect the at least one portion of the transactional information from a source other than the tag, and compare the unique identifier and the at least one portion of the transactional information to the decrypted code.

22. The computer system of claim 21, further comprising:

a transmitter for sending a request to record transactional information relating to the object having the tag.

23. The computer system of claim 22, further comprising:

a server for receiving the request and storing the transactional information and the unique identifier.

24. The computer system of claim 23, wherein the redemption device further includes a transmitter for transmitting the code to the server to verify the transactional information.

25. The computer system of claim 21, wherein the encryption device and the decryption device reside in the server.

26. The computer system of claim 21, wherein the encryption device and the decryption device reside in the point of sale device.

27. A computer system comprising:

a redemption device for capturing transactional information, wherein the transactional information is information collected at a point of a transaction of an object after a manufacturing of the object including a tag having a unique identifier and memory;

a reader for reading the unique identifier and a code from the tag, the code being a code created from encrypting the unique identifier and the transactional information and written into the memory of the tag at the transaction point; and a decryption device for decrypting the code in response to receiving at least one portion of the transactional information.

28. The computer system of claim 27, further comprising:

a transmitter for sending a request to read transactional information relating to the object having the tag.

29. The computer system of claim 28, further comprising:

a server for receiving the request and transmitting the transactional information to the redemption device.

* * * * *

UNITED STATES PATENT AND TRADEMARK OFFICE

CERTIFICATE OF CORRECTION

PATENT NO. : 8,635,459 B2
APPLICATION NO. : 11/047302
DATED : January 21, 2014
INVENTOR(S) : Nicholas P. Lyons et al.

It is certified that error appears in the above-identified patent and that said Letters Patent is hereby corrected as shown below:

In the Claims:

In column 11, line 45, in Claim 21, delete “tag” and insert -- tag of --, therefor.

Signed and Sealed this
Tenth Day of June, 2014

Michelle K. Lee

Michelle K. Lee
*Deputy Director of the United States Patent and Trademark Office*